United States Patent [19]

Gschwender et al.

[11] Patent Number: 4,875,827
[45] Date of Patent: Oct. 24, 1989

[54] FLUID PUMP AND METHOD FOR MAKING THE SAME

[75] Inventors: Alois Gschwender, Neubulach; Horst Krüger, Sulzfeld; Bernhard Schleifer, Kuernbach, all of Fed. Rep. of Germany

[73] Assignee: Flux Geräte GmbH, Stuttgart, Fed. Rep. of Germany

[21] Appl. No.: 137,768

[22] Filed: Dec. 24, 1987

[30] Foreign Application Priority Data

Dec. 24, 1986 [DE] Fed. Rep. of Germany ....... 3644515
Aug. 12, 1987 [DE] Fed. Rep. of Germany ....... 3726794

[51] Int. Cl.$^4$ ............................................. F04D 13/08
[52] U.S. Cl. ..................................... 415/111; 415/229; 384/301; 417/423.12
[58] Field of Search .......... 415/169 A, 170 R, 170 A, 415/72, 73, 109, 110, 111, 112, 142; 384/292, 301; 417/423 M, 433 N; 184/6.18, 26

[56] References Cited

U.S. PATENT DOCUMENTS

| 1,159,504 | 11/1915 | Krogh | 184/6.18 |
| 1,454,682 | 5/1923 | Layne | 384/301 X |
| 1,822,573 | 9/1931 | Fitzgerald et al. | 184/6.18 X |
| 3,767,321 | 10/1973 | Layne | 415/73 X |
| 4,650,430 | 3/1987 | Schiek | 184/26 X |

FOREIGN PATENT DOCUMENTS

| 2334495 | 1/1975 | Fed. Rep. of Germany | 415/72 |
| 2750801 | 5/1979 | Fed. Rep. of Germany | . |
| 3328484 | 2/1985 | Fed. Rep. of Germany | 415/111 |
| 3600721 | 7/1987 | Fed. Rep. of Germany | 415/170 A |
| 244627 | 12/1925 | United Kingdom | 415/169 A |

Primary Examiner—Robert E. Garrett
Assistant Examiner—Joseph M. Pitko
Attorney, Agent, or Firm—Kenyon & Kenyon

[57] ABSTRACT

A fluid pump has a casing and a support tube mounted within the casing. A rotatably mounted drive shaft is inserted through the support tube and has a propeller mounted on one end thereof for moving fluid through the pump. A helical shaped bearing is seated between the drive shaft and the support tube for supporting the shaft and permitting fluid flow therethrough.

22 Claims, 5 Drawing Sheets

FLUID PUMP AND METHOD FOR MAKING THE SAME

FIELD OF THE INVENTION

The invention relates to fluid pumps, and in particular to drum type fluid pumps having rotatably mounted drive shafts.

BACKGROUND OF THE INVENTION

Known drum type fluid pumps generally have a propeller mounted on a drive shaft for moving fluid through the pump. The shaft is rotatably mounted on bearings spaced along the axial length of the shaft and is contained within a support tube. The bearings are generally of a ball or roller type which must assume a precise fit between the shaft and the tube. Accordingly, one disadvantage associated with such pumps is that they are both complicated and expensive to manufacture.

The German patent No. 2,750,801 shows a pump having a shaft supported within a tube and a plastic hose situated between the shaft and the tube which acts as a bearing. One problem associated with this type of pumps that particles within the fluid being pumped may form deposits between the plastic hose and the shaft, as well as between the hose and support tube. Such deposits are generally not removed by the flow of the fluid being pumped, nor can they be removed by simply rinsing the pump, and accordingly can cause premature pump failure.

It is an object of the invention therefore to provide a fluid pump that overcomes the above mentioned problems and disadvantages of known fluid pumps.

It is a further object of the invention to provide a fluid pump having a rotatably mounted drive shaft contained within a support tube wherein fluid particle deposits will not form around the shaft and which can be simply and economically manufactured.

Other objects and advantages of the invention will become apparent in view of the detailed description below and drawings taken in connection therewith.

SUMMARY OF THE INVENTION

The invention is directed to a fluid pump comprising a casing and a support tube mounted within the casing. A drive shaft of the pump is inserted through the support tube and rotatably mounted within the casing. A propeller of the pump is mounted to one end of the drive shaft for moving fluid through the pump. The pump further includes a helical shaped bearing which is seated between the drive shaft and the support tube for rotatably supporting the drive shaft within the tube and for permitting the flow of fluid therethrough.

DETAILED DESCRIPTION OF PREFERRED EMBODIMENTS

Figures 1, 2:
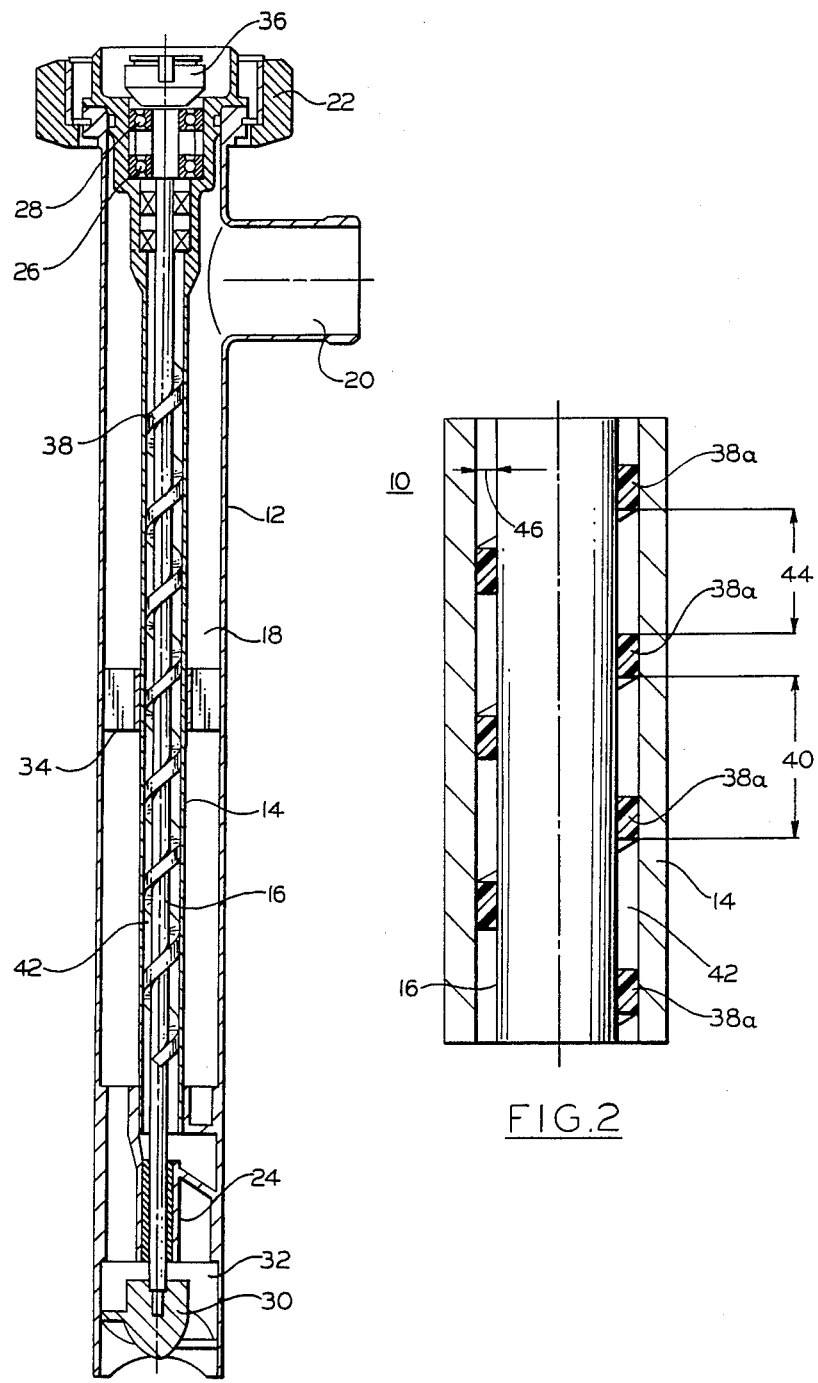
FIG. 1 illustrates a front cross-sectional view of a fluid pump embodying the invention.
FIG. 2 is an enlarged cross-sectional view illustrating a portion of the support tube, drive shaft and helical bearing of the pump of FIG. 1.

In FIG. 1, a fluid pump embodying the invention is illustrated generally 10. The fluid pump 10 includes a casing 12, a support tube 14 and a drive shaft 16. As can be seen in FIG. 1, the casing 12 is elongated and substantially cylindrical in shape and the support tube 14 is coaxially mounted therein. An annular uptake channel 18 of the pump is defined between the inner wall of casing 12 and the support tube 14. The casing 12 further defines an outlet portion 20 which projects outwardly therefrom near the upper end of the casing. As described in further detail below, fluid is pumped upwardly through channel 18 and outwardly through portion 20. A screw cap 22 of the pump is mounted on the upper end of casing 12 for connection to a mating member on a pump drive motor, not shown.

The drive shaft 16 is rotatably mounted within support tube 14 and coaxial therewith, and has a diameter preferably between 2 mm and 30 mm. The shaft 16 is mounted on its lower end by means of bearings 24. The upper end of shaft 16 is similarly mounted by means of a pair of bearings 26 and 28 which, as shown in FIG. 1, are spaced axially apart. The bearings 24, 26 and 28 are any of a variety of those known in the art, such as, for example, ball or roller type bearings. A propeller 30 of the pump is fixed to the lower end of shaft 16 for rotation within a propeller chamber 32 defined in the lower end of casing 12. As shown in FIG. 1, the chamber 32 opens upwardly into the annular channel 18, so that when fluid is forced upwardly by the rotation of propeller 30 it flows through channel 18 and into the outlet portion 20.

The support tube 14 is supported near the middle of casing 12 by means of supports 34 of the pump. The supports 34 are sufficiently apertured in a known manner to permit the flow of fluid therethrough. A clutch member 36 of the pump is mounted on the upper end of shaft 16 for driving engagement with a pump motor, not shown.

The drive shaft 16 is supported within tube 14 by means of a helical shaped bearing 38. The bearing 38 extends substantially across the entire axial length of the shaft 16 within the tube 14. The helical bearing 38 is preferably formed of a synthetic material having a low coefficient of friction, yet exhibiting strong resistance to any corrosive medium which is to be pumped. Polytetrafluoroethylene has proven to be a particularly suitable material. Glass fibers, carbon or graphite can also be added to the polytetrafluorethylene compound to produce a harder and more resilient helical bearing having excellent wear properties. The carbon and graphite also exhibit a low coefficient of friction and therefore increase the lubricity of the bearing 38.

Turning to FIG. 2, the helical bearing 38 includes successive helical turn portions 38a. The bearing 38 has a pitch 40 which measures the axial distance between the same face of each helical turn portion 38a. The pitch 40 is preferably constant across the axial length of the bearing 38 so that the shaft 16 is uniformly supported. However, in certain circumstances it may be preferable to vary the pitch 40. For example, if the pitch 40 is increased toward the lower end of the shaft any fluid will flow through the helical bearing and along the shaft at a faster rate along the lower end than near the upper end of the shaft. In any case, however, when the pump 10 is removed from a body of fluid any fluid within the support tube 14 will flow freely through the helical bearing and out of the pump and accordingly, remove any fluid particle deposits therein.

The size of the pitch 40 may also be determined to optimally support the shaft 16. As can be seen, if the pitch is small, there are a greater number of helical turn portions 38a within a given axial length of the shaft 16. Likewise, if the pitch is large, there are fewer helical turn portions across the length of the shaft 16. It has been determined that the pitch 40 should preferably be increased with an increase in the diameter of the shaft 16. The ratio of the diameter of the shaft 16 to the pitch 40 may vary between 0.07 and 30, but is preferably between 0.1 and 5.

Figure 3:
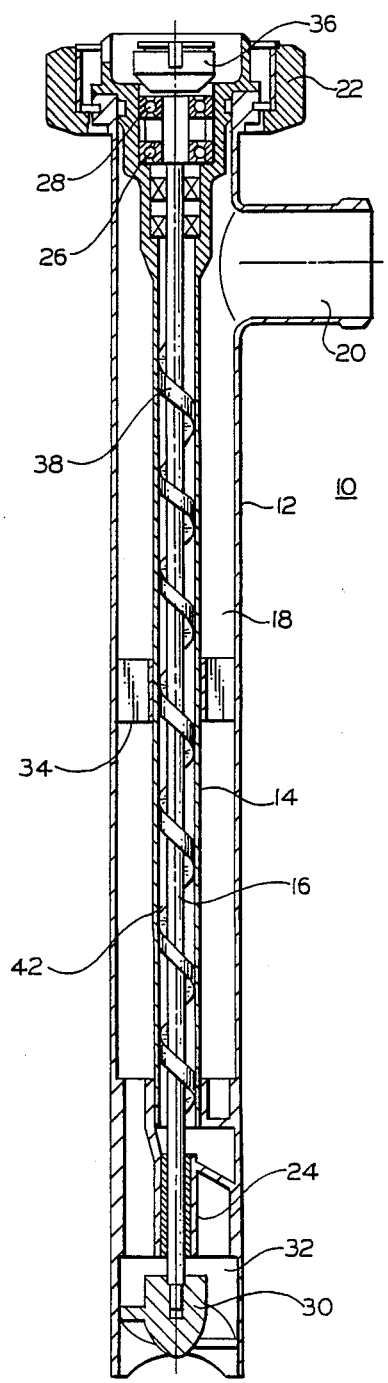
FIG. 3 illustrates another embodiment of the fluid pump of the invention wherein the helical bearing is wound in the opposite direction as shown in FIG. 1.

In FIG. 3, another embodiment of the pump 10 of the invention is shown, which is the same as that shown in FIG. 1 except that the helical bearing 38 is wound in the opposite direction. The helical bearing of FIG. 1 is described as left handed, whereas the helical bearing of FIG. 3 is described as right handed. The shaft 16 of the pump rotates in only one direction, and therefore the fluid flowing along the helical bearing 38 will also move in only oe direction depending upon the direction in which the helical bearing is wound. The flow of fluid across the shaft 16 is therefore directed either upwardly or downwardly depending upon the direction in which the helical bearing is wound. If the fluid being pumped is needed to lubricate the shaft 16 then the helical bearing is wound so that the fluid moves upwardly along the shaft and therefore lubricates the entire length of the shaft.

As shown in FIG. 2 the helical bearing 38 which is situated between the tube 14 and shaft 16 defines a helical interspace 42 having an axial distance 44 between each successive turn porton 38a, and through which the fluid being pumped flows across the shaft 16. The ratio of the diameter of the shaft 16 to the axial distance 44 is varied depending upon the fluid medium to be pumped. This ratio can range between approximately 0.08 and 50, but is preferably between 0.1 and 7.5. If the fluid medium to be pumped is relatively viscous, then the axial distance 44 of the interspace is increased as compared to that required for a low viscosity fluid. However, in each case, the axial distance 44 of the interspace is determined to provide optimal support for the shaft 16, yet be sufficiently wide to permit the fluid pumped to flow freely therethrough. In order to optimally support the shaft 16 the ratio of the diameter of the shaft to the axial distance 44 of the interspace is approximately between 0.4 and 25, and preferably between 0.6 and 7.5.

Similarly, the fluid flow capacity of the interspace 42 may also be determined by varying the radial thickness 46 of each helical turn portion 38a. As can be seen, if the thickness 46 is increased then the volume of the interspace 42, and therefore the fluid flow capacity is also increased. The ratio of the diameter of the shaft 16 to the thickness 46 is approximately between 0.4 and 30, and is preferably between 1.0 and 7.5.

The helical bearing 38 is seated between the shaft 16 and support tube 14 so that the bearing 38 is pushed toward the tube 14 by the rotation of the shaft 16. Accordingly, during the operation of the pump 10 the helical bearing 38 is pressed firmly by the rotating shaft 16 against the inner wall of the support tube 14.

In assembling the pump 10, the helical bearing 38 may be formed from a tube which is cut to an appropriate length and then slotted to form the helical shape. The bearing 38 is then twisted at each end so that its outer diameter is less than the inner diameter of the support tube 14. In the twisted state, the helical bearing 38 is then easily inserted into the support tube 14. As soon as the bearing 38 is properly fitted within the tube 14, it is then released and permitted to spring back toward its initial, untwisted position so as to press firmly against the inner wall of the support tube 14. The shaft 16 is then inserted through the helical bearing 38 and rotatably mounted on its ends as described above.

In order to ensure reliable retention of the bearing 38 within the support tube 12, the outer diameter of the helical bearing 38 in its free state is greater than the inner diameter of the support tube 14. As such, when fitted within the support tube 14 the helical bearing 38 will press firmly against the inner walls thereof and accordingly, does not require additional fastening members to secure the bearing 38 from movement in the axial direction. The bearing 38 is also secured from axial movement by the rotation of the shaft 16 which, as described above, acts to press the bearing against the support tube 14.

Figure 4:
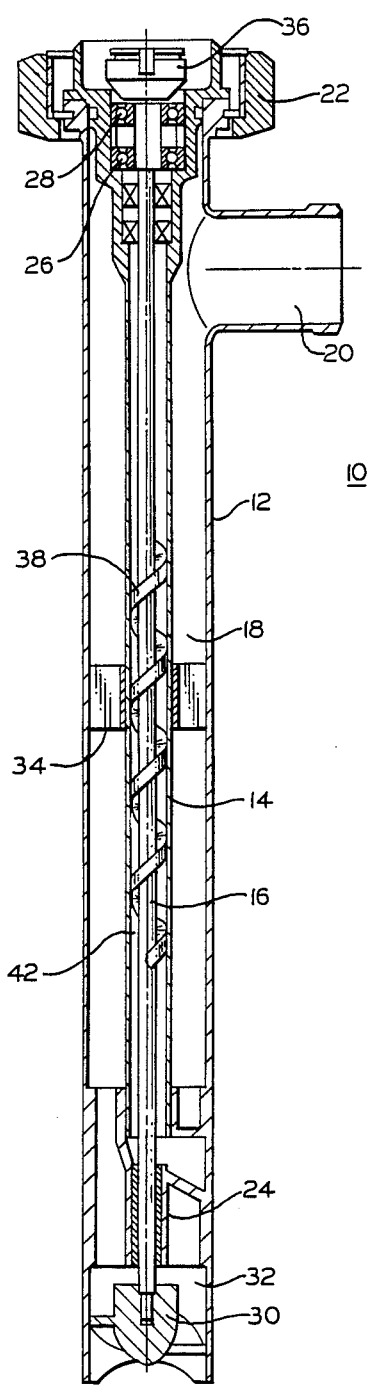
FIG. 4 is another embodiment of the fluid pump of the invention wherein the helical bearing extends along only a portion of the length of the shaft.

In FIG. 4, another embodiment of the invention is illustrated wherein the pump 10 comprises a helical bearing 38 which has a shorter axial length than the bearing 38 shown in FIG. 1. Accordingly, in certain circumstances it is not necessary that the bearing 38 extend along the entire length of the shaft 16.

Figure 5:
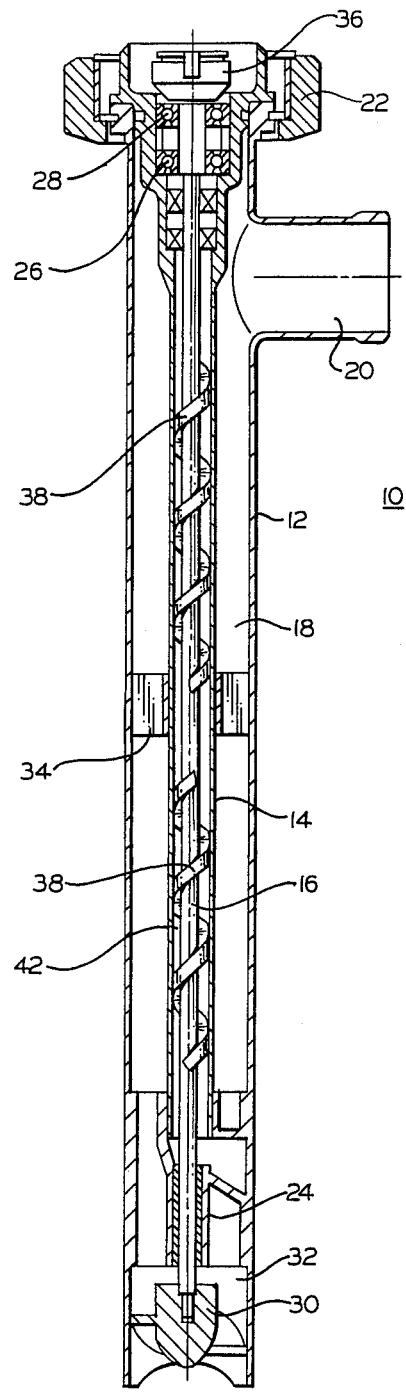
FIG. 5 illustrates another embodiment of the fluid pump of the invention having more than one helical bearing.

In another embodiment of the invention shown in FIG. 5, the pump 10 comprises two helical bearings 38. This configuration is particularly useful if the shaft 16 is relatively long. The inner ends or the helical bearings 38 may abut against one another or, as shown in FIG. 5, they may be spaced axially apart near the middle of the casing 12.

In the foregoing specification, the invention has been described with reference to specific exemplary embodiments thereof. It will, however, be evident that various modifications and changes may be made thereto without departing from the scope of the appended claims. The specification and drawings are, accordingly, to be regarded in an illustrative rather than in a restrictive sense.

What is claimed:

1. A fluid pump, said pump comprising:
    a casing,
    a support tube mounted within said casing,
    a drive shaft inserted through said support tube and rotatably mounted within said casing,
    propulsion means connected to one end of said drive shaft for moving fluid between said support tube and said casing and through said pump, and
    at least one helical shaped bearing seated between said drive shaft and said support tube for rotatably supporting said drive shaft within said support tube, said helical shaped bearing defining an exterior helical surface and an opposite interior helical surface, said helical shaped bearing being dimensioned so that said exterior helical surface presses against said support tube to prevent movement of said helical shaped bearing relative to said support tube, said helical shaped bearing also defining a generally helical space between said drive shaft and said support tube for permitting the flow of fluid therethrough.

2. A fluid pump according to claim 1, wherein said drive shaft has an elongated cylindrical shape.

3. A fluid pump according to claim 2, wherein the ratio between the diameter of said drive shaft and the pitch of said helical shaped bearing is between 0.07 and 30.

4. A fluid pump according to claim 2, wherein the ratio between the diameter of said drive shaft and the axial distance between each successive turn of said helical shaped bearing is between 0.08 and 50.

5. A fluid pump according to claim 2, wherein the ratio between the diameter of said drive shaft and the radial thickness of each turn of said helical shaped bearing is between 0.4 and 30.

6. A fluid pump according to claim 2, wherein the ratio between the diameter of said drive shaft and the axial width of each turn of said helical shaped bearing is between 0.4 and 25.

7. A fluid pump according to claim 1, wherein said helical shaped bearing is right handed.

8. A fluid pump according to claim 1, wherein said helical shaped bearing is left handed.

9. A fluid pump according to claim 1, wherein said helical shaped bearing extends substantially along the entire axial length of said drive shaft within said suport tube.

10. A fluid pump according to claim 1, wherein said helical shaped bearing has a constant pitch over its axial length.

11. A fluid pump according to claim 1, said pump comprising:
two of said helical shaped bearings axially disposed relative to one another and inserted between said drive shaft and said support tube.

12. A fluid pump according to claim 1, wherein said helical shaped bearing is formed of a synthetic material.

13. A fluid pump according to claim 12, wherein said synthetic material is polytetrafluoroethylene.

14. A fluid pump according to claim 1, wherein said helical shaped bearing extends along only a portion of the axial length of said drive shaft within said support tube.

15. A fluid pump, said pump comprising:
a pump housing;
a drive shaft rotatably mounted within said pump housing;
a bearing support member mounted within said pump housing and fitted over said drive shaft;
at least one helical shaped bearing seated between said drive shaft and said bearing support member for supporting said drive shaft within said support member and for permitting the rotation of said drive shaft therein, said helical shaped bearing defining an exterior helical surface and an interior helical surface, the tension within said helical bearing urging said exterior helical surface against said support member to prevent movement of said helical bearing relative to said support member, said helical shaped bearing further defining a generally helical space between said drive shaft and said support tube; and
propeller means mounted to said drive shaft for propelling fluid upon rotation of said drive shaft.

16. A fluid pump as defined in claim 15, wherein said helical shaped bearing is right-handed.

17. A fluid pump according to claim 15, wherein said helical shaped bearing is left-handed 18. A fluid pump according to claim 15, wherein said helical shaped bearing extends substantially along the entire axial length of said drive shaft within said bearing support member.

19. A fluid pump according to claim 15, said pump comprising:
two of said helical shaped bearings seated between said drive shaft and said bearing support member, said helical shaped bearings being axially spaced relative to one another.

20. A fluid pump as defined in claim 15, wherein said helical shaped bearing is formed of a synthetic material.

21. A fluid pump as defined in claim 15, wherein said helical shaped bearing is formed of polytetrafluoroethylene.

22. A fluid pump as defined in claim 21, wherein said helical shaped bearing formed of polytetrafluoroethylene includes glass fibers, carbon and/or graphite.

* * * * *